United States Patent
Matt

(10) Patent No.: US 6,247,119 B1
(45) Date of Patent: Jun. 12, 2001

(54) APPARATUS HAVING A FLATTENER FOR OUTPUTTING ALIGNED OR UNALIGNED INFORMATION FROM AN INSTRUCTION EXECUTION PIPELINE

(75) Inventor: David R. Matt, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/198,795

(22) Filed: Nov. 24, 1998

Related U.S. Application Data

(60) Provisional application No. 60/066,959, filed on Nov. 26, 1997.

(51) Int. Cl.[7] .................................................. G06F 9/00
(52) U.S. Cl. ................................ 712/228; 714/30; 714/45
(58) Field of Search ............................. 712/200, 43, 227, 712/220, 228; 714/724, 30, 733, 39, 35, 34, 25, 27, 37, 45

(56) References Cited

U.S. PATENT DOCUMENTS

| | | | |
|---|---|---|---|
| 5,751,735 | * | 5/1998 | Tobin et al. .......................... 714/733 |
| 5,838,692 | * | 11/1998 | Tobin .................................. 714/724 |
| 5,838,897 | * | 11/1998 | Bluhm et al. ......................... 714/30 |
| 5,867,644 | * | 2/1999 | Ranson et al. ....................... 713/39 |
| 6,035,422 | * | 3/2000 | Hohl et al. ............................ 714/35 |
| 6,081,885 | * | 6/2000 | Deao et al. ........................... 712/227 |

* cited by examiner

Primary Examiner—John A. Follansbee
(74) Attorney, Agent, or Firm—W. Daniel Swayze, Jr.; W. James Brady; Frederick J. Telecky, Jr.

(57) ABSTRACT

An integrated circuit (12) includes a processor (17) having an instruction execution pipeline (22). The pipeline has a plurality of successive stages (26–42) which correspond to respective successive phases of instruction execution. Instructions being executed move successively through the stages (26–42). A flattener section (18) is provided in the integrated circuit (12), and holds the state of certain pipeline signals until subsequent points in time. This permits various signals generated at different points in time during execution of an instruction to all be simultaneously available at a later point in time. A selector section (19) of the integrated circuit (12) selects either the output of the flattener section (18) or certain pipeline signals to be exported off the integrated circuit.

8 Claims, 6 Drawing Sheets

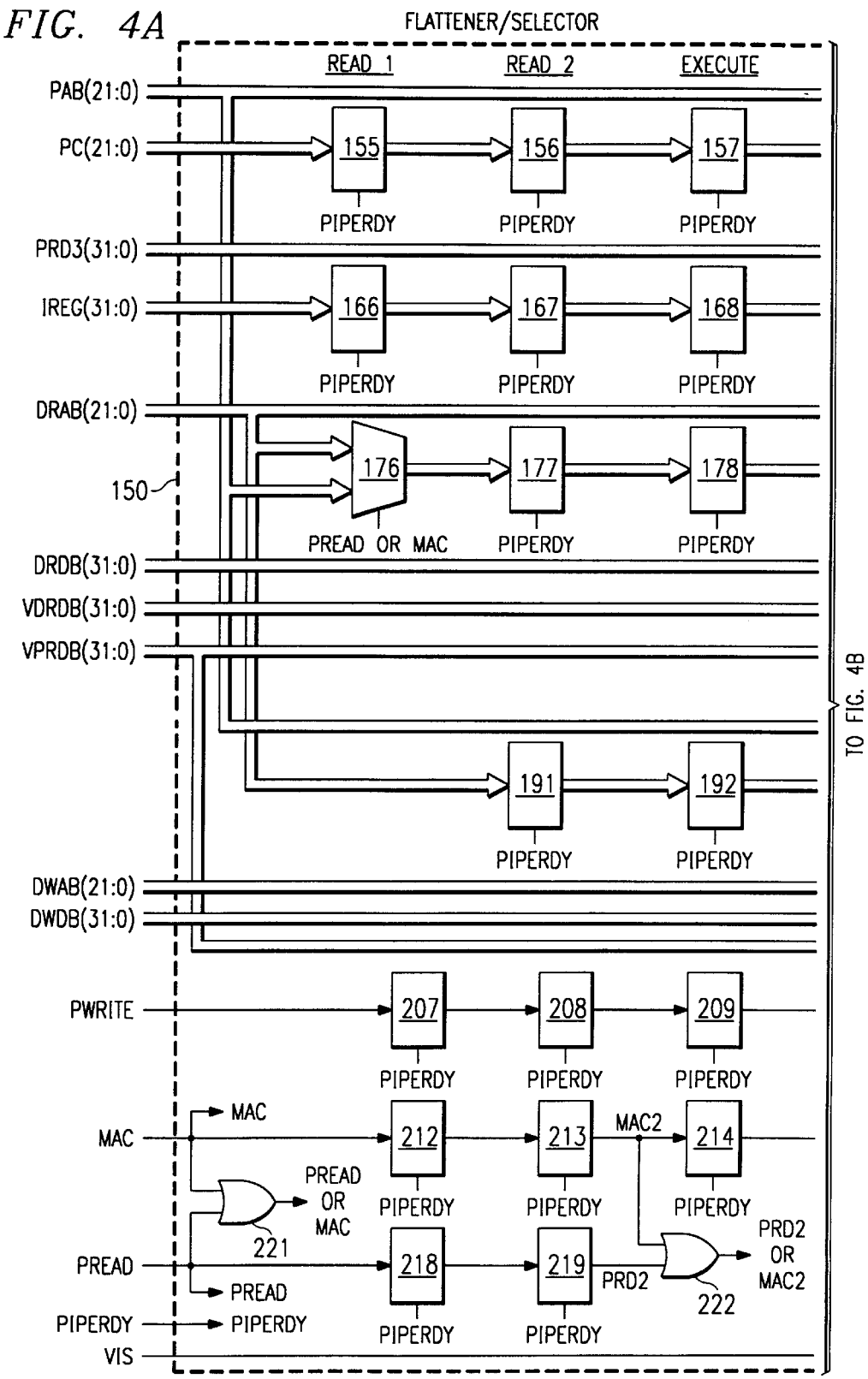

APPARATUS HAVING A FLATTENER FOR OUTPUTTING ALIGNED OR UNALIGNED INFORMATION FROM AN INSTRUCTION EXECUTION PIPELINE

This application claims the benefit of Provisional No. 60/066,959 filed Nov. 26, 1997.

TECHNICAL FIELD OF THE INVENTION

This invention relates in general to systems which have a processor with an instruction execution pipeline and, more particularly, to an apparatus for outputting information from an instruction execution pipeline in either an aligned or unaligned format.

BACKGROUND OF THE INVENTION

Processor architectures often separate the actions associated with executing an instruction into a plurality of successive stages. At a given point in time, several different instructions may be at respective different stages of execution. This technique, which is known as pipelining, increases the overall performance of the processor. However, pipelining can result in difficulty for a system developer who is attempting to debug the system, and who in particular is attempting to associate various signals in the pipeline to the instruction which performed them. This is because, at any given point in time, the pipeline includes various different signals which correspond to different instructions.

For example, a first stage of the pipeline may be handling a first instruction which is being decoded, a second stage may be handling a second instruction which is issuing an address for a memory read, a third stage may be handling a third instruction which is receiving data from a memory read, and a fourth stage may be handling a fourth instruction which is issuing an address and data for a memory write. Thus, as to any given instruction, it is not possible with the pipeline alone to observe, at a single point in time, all of the activity associated with execution of that instruction.

A known approach is to provide a flattener circuit, which buffers or delays selected pipeline signals until a later point in time. In particular, different signals from different pipeline stages are delayed by different amounts of time. The flattener simultaneously outputs all of the selected information for a given instruction, even though the information was gathered at different points in time during the execution of the instruction. While conventional flatteners of this type have been adequate for their intended purposes, they have not been satisfactory in all respects.

For example, where the processor and its pipeline are implemented in an integrated circuit, the flattener has been provided externally to the integrated circuit. Consequently, in order to have access to certain control signals of the pipeline, which normally would not be brought off the integrated circuit, a large number of external connection pins of the integrated circuit must be dedicated to pipeline signals, so that the external flattener can have access to the signals.

The number of external connection pins can be reduced slightly by providing off-chip circuitry to generate certain signals that are also generated within the integrated circuit, but such off-chip circuitry effectively duplicates circuitry within the integrated circuit, and thus increases the cost and power consumption of the overall system. A further consideration is that, in such systems, the flattener is remote from the source of pipeline activity, and thus may not be capable of operating at the speed of the processor when the processor is operating at higher frequencies, except through an approach which is sufficiently complex to be effectively cost-prohibitive.

SUMMARY OF THE INVENTION

From the foregoing, it may be.appreciated that a need has arisen for an apparatus which effects alignment of pipeline information while using a minimal number of external connection pins of an integrated circuit containing the pipeline, while avoiding duplicative circuitry, and while permitting the flattener to operate with the processor at higher speeds but without excessive cost.

According to the present invention, an integrated circuit is provided to address this need, and includes: a plurality of external connection pins; a processor which executes instructions from an instruction sequence, the processor including an instruction execution pipeline having a plurality of successive stages which correspond to respective successive phases of instruction execution, and the pipeline being operative to move instructions of the instruction sequence successively through the stages so that, at each of a plurality of successive points in time, each stage corresponds to a respective phase of execution of a respective instruction. The stages of the pipeline include a first stage, and a second stage immediately successive to the first stage. The integrated circuit includes a flattener register having an output which is coupled to a selected one of the external connection pins, and having an input which is coupled to a signal of the pipeline associated with the first stage. The integrated circuit is operative to cause the register to be loaded from the input thereof in association with an instruction being moved from the first stage to the second stage, so that when such instruction is in the second stage, the register maintains the state which the signal had when that instruction was in the first stage.

BRIEF DESCRIPTION OF THE DRAWINGS

A better understanding of the present invention will be obtained from the detailed description which follows, taken in conjunction with accompanying drawings, in which.

DETAILED DESCRIPTION OF THE INVENTION

Figure 1:
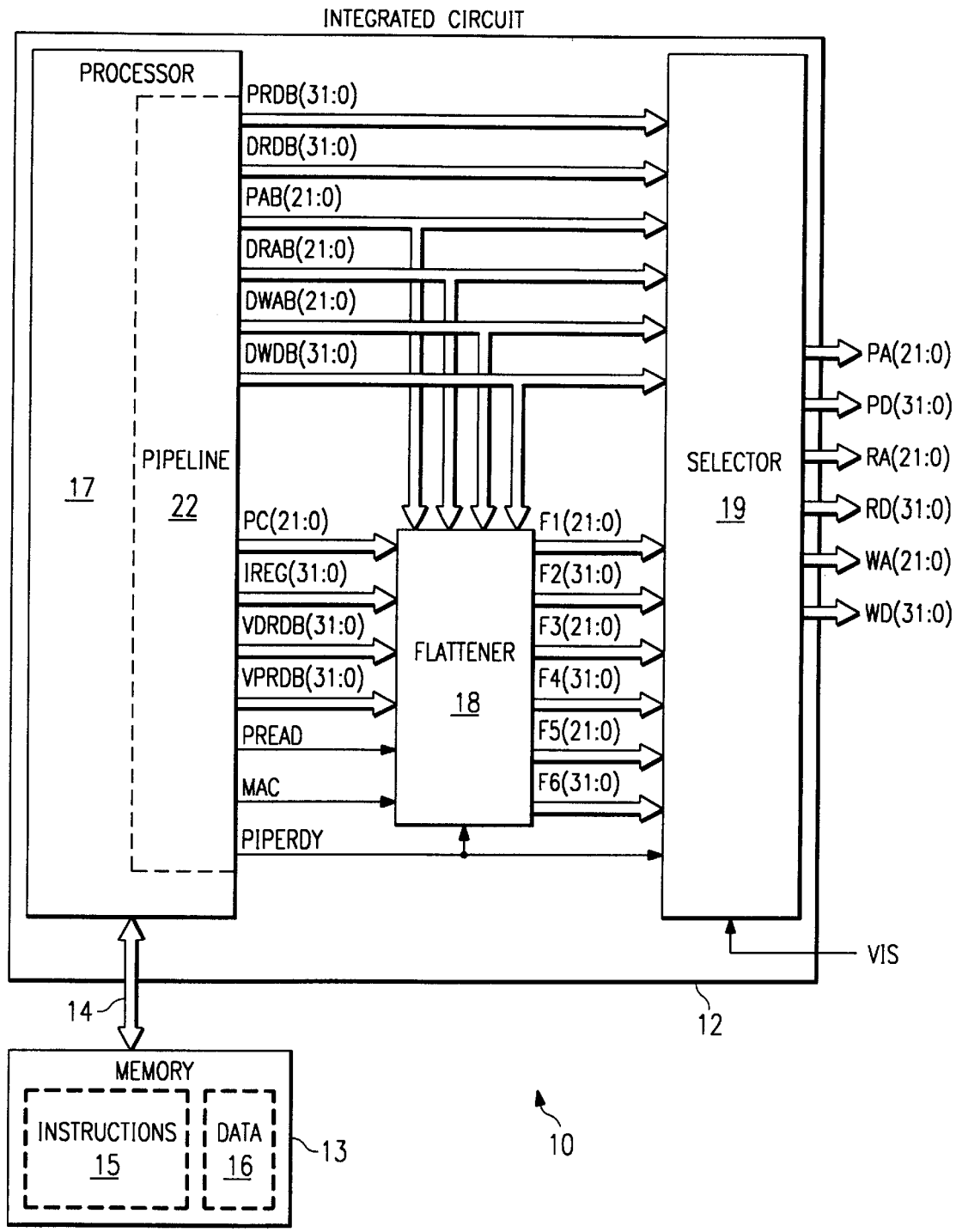
FIG. 1 is a block diagram of a system which embodies the present invention.

FIG. 1 is a block diagram of a system which embodies the invention and which is designated generally with reference numeral 10. The system 10 includes an integrated circuit 12, and an external memory 13 which is coupled by a bus 14 to the integrated circuit 12. The memory 13 includes a portion 15 which stores a sequence of instructions, and a portion 16 which stores data. The bus 14 may include two or more separate buses which each include address, data and control lines, for example two buses which respectively couple the integrated circuit 12 to the instruction portion 15 and the data portion 16 of memory 13.

The integrated circuit 12 includes a processor 17, a flattener section 18, and a selector section 19. The various lines of bus 14 are each coupled from the processor 17 to a respective external connection pin of the integrated circuit 12, and from the external connection pin to the memory 13.

Figure 2:
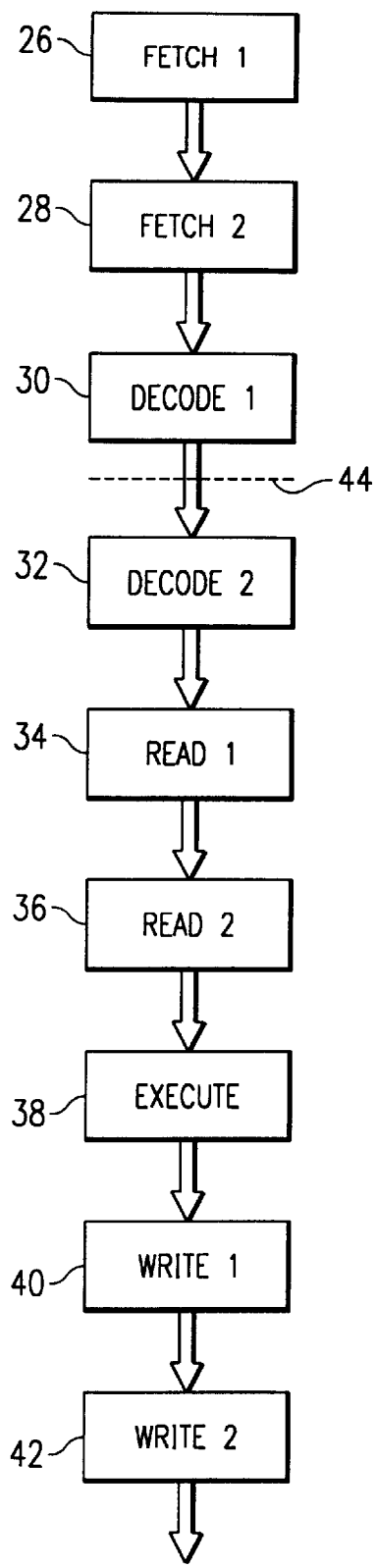
FIG. 2 is a diagrammatic view of a plurality of stages of an instruction execution pipeline.

The processor 17 includes an instruction execution pipeline 22. The instruction execution pipeline 22 has a plurality of successive stages, which correspond to respective successive phases of instruction execution. FIG. 2 is a diagrammatic view of the stages of instruction execution. In FIG. 2, the stages of execution include a FETCH1 stage 26, a FETCH2 stage 28, a DECODE1 stage 30, a DECODE2 stage 32, a READ1 stage 34, a READ2 stage 36, an EXECUTE stage 38, a WRITE1 stage 40, and a WRITE2 stage 42.

In the FETCH1 stage 26, an instruction address is supplied to the instruction portion 15 in memory 13, and then the instruction is read from that address in the FETCH2 stage 28. Then, in the DECODE1 stage 30, initial decoding of the operation code of the instruction takes place. In the DECODE2 stage 32, the operation code of the instruction is further decoded. In the READ1 stage 34, a data address is provided to the data portion 16 of memory 13, and the data is then read from that address in the READ2 stage 36. The EXECUTE stage 38 is used for an instruction execution step, such as adding a number retrieved from memory to a number in a processor register. In the WRITE1 stage 40, an address where data is to be written is output for the data portion 16 of memory 13, and then the data to be written into the data portion 16 is supplied to the memory 13 in the WRITE2 stage 42.

Instructions which enter one or more of the stages 26, 28 and 30 may be discarded without being executed to completion. For example, instructions which follow a conditional branch instruction in the instruction sequence may enter one or more of the stages 26, 28 and 30, and then be discarded if the branch is executed. On the other hand, instructions which pass at 44 from the DECODE1 stage 30 to the DECODE2 stage 32 are always executed to completion in the disclosed embodiment. Some instructions, such as a register to register transfer, may not require a memory read or memory write, but they will still advance successively through the pipeline stages 32, 34, 36, 38, 40 and 42, even if there is no action occurring in one or more of these stages.

In the absence of a discontinuity such as a branch instruction, each of the stages shown in FIG. 2 will, at a given point in time, correspond to a respective different instruction. Respective instructions in respective stages all advance simultaneously from one stage to the next. For a given instruction, some pipeline signals associated with execution of that instruction are available when the instruction is in the DECODE2 stage 32, others are available at a later point in time when the instruction is in the READ1 stage 34, still others are available at an even later point in time when the instruction is in the EXECUTE stage 38, and yet others are available at a still later point in time when the instruction is in the WRITE1 stage 40. To facilitate debugging, it is desirable to be able to see all these signals for a given instruction at the same time, rather than at different points in time. The flattener section 18 (FIG. 1) effects this alignment in time, in a manner described in more detail later.

FIG. 1 shows a number of internal signals of the pipeline 22 which are coupled to the flattener section 18 and/or the selector section 19. More specifically, a 32-bit bus PRDB carrying program-read data is coupled from the pipeline 22 to the selector section 19. A 32-bit bus DRDB carrying data-read data is also coupled from the pipeline 22 to the selector section 19. A 22-bit bus PAB carrying program address information is coupled from the pipeline 22 to both the flattener section 18 and the selector section 19. Similarly, two 22-bit buses DRAB and DWAB are coupled from the pipeline 22 to both the flattener section 18 and the selector section 19, and respectively carry a data-read address and a data-write address. Similarly, a 32-bit bus DWDB carrying data-write data is coupled from the pipeline 22 to both the flattener section 18 and the selector section 19.

A 22-bit bus PC which carries a DECODE2 stage instruction address is coupled from the pipeline 22 to the flattener section 18. A 32-bit bus IREG carrying a DECODE2 stage instruction operation code is coupled from the pipeline 22 to the flattener section 18. Further, two 32-bit buses VDRDB and VPRDB are each coupled from the pipeline 22 to the flattener section 18, and respectively carry data-read data bus results and program-read data bus results.

A signal PREAD is coupled from the pipeline 22 to the flattener section 18, and is actuated when an instruction in the READ1 stage is of a type that effects a read from the program or instruction memory 15. A further signal MAC is coupled from the pipeline 22 to the flattener section 18, and is actuated when the instruction in the READ1 stage is of a type that effects reads from both the program or instruction memory 15 and the data memory 16. A pipeline ready signal PIPERDY is coupled from the pipeline 22 to both the flattener section 18 and the selector section 19. Within the pipeline 22, the PIPERDY signal controls the shifting of instructions from stage to stage through the pipeline. In particular, each time there is a leading edge on the PIPERDY signal, respective instructions in each of the stages of the pipeline (FIG. 2) are shifted simultaneously to the next successive stage.

The flattener section 18 outputs six buses F1, F2, F3, F4, F5 and F6, each of which is coupled to the selector section 19. The buses F1, F3 and F5 are 22-bit buses, and the buses F2, F4 and F6 are 32-bit buses.

An external connection pin of the integrated circuit 12 carries a visibility signal VIS, which is coupled to an input of the selector section 19. The visibility signal VIS specifies whether the selector section 19 is to operate in a flattener mode of operation or a visibility mode of operation, as discussed later. The selector section 19 outputs six buses, including three 22-bit address buses PA, RA, and WA, and three 32-bit data buses PD, RD and WD. These six buses are all exported off the integrated circuit 12 through a plurality of external connection pins of the integrated circuit 12.

Figure 3A:
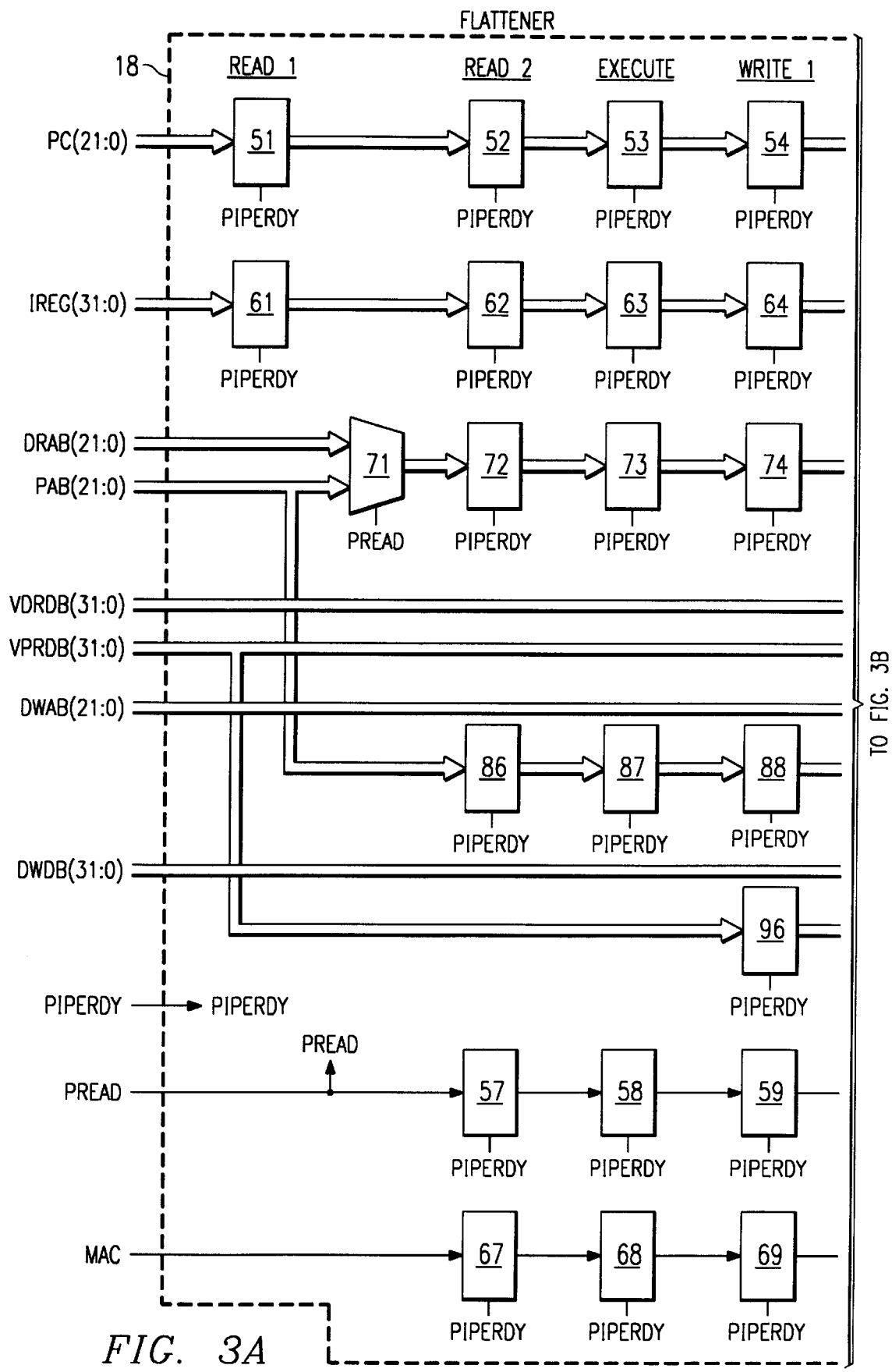
FIG. 3 is a diagrammatic view of a flattener section and selector section, which are portions of the system of FIG. 1.
Figure 3B:
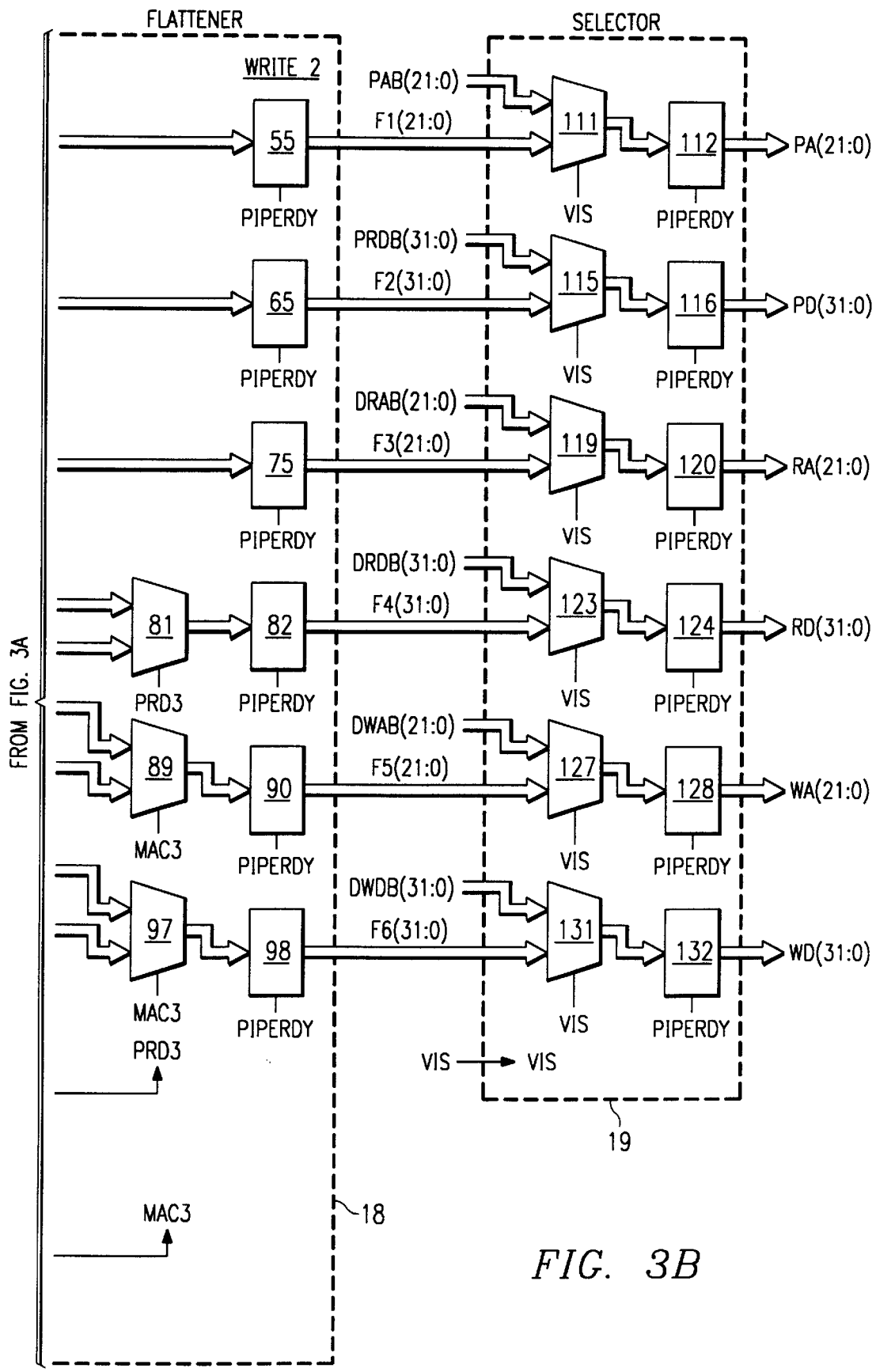

FIG. 3 is a diagrammatic view which shows the flattener section 18 and the selector section 19 in more detail. The flattener section 18 includes five 22-bit buffer registers 51–55, which are coupled in series between the inputs for the PC bus and the outputs for the F1 bus. More specifically, the bus PC is coupled to the inputs of register 51, the outputs of register 51 are coupled to the inputs of register 52, the outputs of register 52 are coupled to the inputs of register 53, the outputs of register 53 are coupled to the inputs of register 54, the outputs of register 54 are coupled to the inputs of register 55, and the outputs of register 55 serve as the output bus F1 from the flattener section 18. The signal PIPERDY is coupled to each of the registers 51–55, and causes information to shift through these registers synchronously with the shifting of instructions through the pipeline stages. Although the term "register" is used herein, it will be recognized that the devices 51–55 could each be a register or some other type of device, such as a latch.

In FIG. 3, each of the registers 51–55 has above it a label identifying the respective pipeline stage which contains a respective instruction corresponding to the information in that register. More specifically, the bus PC is valid for an instruction which is currently in the DECODE2 stage 32. When that instruction is shifted from the DECODE2 stage 32 to the READ1 stage 34, the information on the PC bus is loaded into register 51. As the same instruction is thereafter shifted successively to the READ2 stage 36, the EXECUTE stage 38, the WRITE1 stage 40 and the WRITE2 stage 42, the information in the register 51 is successively shifted to the registers 52, 53, 54 and 55.

The flattener section 18 also includes five 32-bit buffer registers 61–65, which are coupled in series between the input for the IREG bus and the output for the F2 bus, and which are controlled by the signal PIPERDY. The information on the IREG bus is valid for an instruction which is in the DECODE2 stage 32, and the registers 61–65 respectively hold that information when the associated instruction is respectively in the stages 34, 36, 38, 40 and 42.

The flattener section 18 also includes three 1-bit buffer registers 57–59 which are coupled in series, and controlled by the signal PIPEDRY. The input to register 57 is coupled to the pipeline signal PREAD. The signal PREAD is valid for an instruction which is in the READ1 stage, and that state of the signal PREAD is shifted successively into the registers 57, 58 and 59 as that instruction is respectively shifted into the READ2, EXECUTE and WRITE1 pipeline stages. The output of the register 59 is a signal PRD3, which is a delayed version of the signal PREAD.

The flattener section 18 also includes three 1-bit buffer registers 67–69 which are coupled in series, and which are controlled by the signal PIPEDRY. The input to register 67 is the pipeline signal MAC. The pipeline signal MAC is valid for an instruction which is in the READ1 stage, and the state of the signal MAC is shifted successively into the registers 67, 68 and 69 as that instruction is successively shifted into the READ2, EXECUTE and WRITE1 pipeline stages. The output of the register 69 is a signal MAC3, which is a delayed version of the signal MAC.

The flattener section 18 includes a 22-bit two-to-one selector 71, having one set of inputs coupled to the flattener section inputs for the bus DRAB, and having another set of inputs coupled to the flattener section inputs for the bus PAB. The selector 71 has a single set of outputs. The selector 71 has a control input which is controlled by the signal PREAD. When an instruction is in the READ1 stage 34 of the pipeline, information associated with that instruction is on one or both of the buses DRAB and PAB. The PREAD signal is actuated for an instruction which effects a read from the program memory and, when actuated, it causes the selector 71 gate to its outputs the information from the PAB bus. Otherwise, when the signal PREAD is not actuated, the selector 71 gates to its outputs the information from the DRAB bus.

Four 22-bit buffer registers 72–75 are coupled in series between the outputs of the selector 71 and the output bus F3 of the flattener section 18. The registers 72–75 are each controlled by the PIPERDY signal. The information from one of the buses DRAB and PAB, as selected by selector 71, is loaded into the register 72 when the associated instruction advances from the READ1 stage 34 to the READ2 stage 36. Thereafter, the information is advanced from register 72 successively to the registers 73, 74 and 75 as the associated instruction is advanced successively to the EXECUTE, WRITE1 and WRITE2 pipeline stages.

The flattener section 18 includes a 32-bit two-to-one selector 81 having one set of inputs coupled to the flattener inputs for the VDRDB bus, and another set of inputs coupled to the flattener inputs for the VPRDB bus. The selector 81 has a single set of outputs, and has a control input coupled to the signal PRD3, which as mentioned above is a delayed state of PREAD. The outputs of selector 81 are coupled to the inputs of a 32-bit buffer register 82, the register 82 having outputs which serve as the output bus F4 from the flattener section 18. The information on the buses VDRDB and VPRDB is valid for an instruction which is currently in the WRITE1 stage 40. When that instruction is shifted from the WRITE1 stage 40 to the WRITE2 stage 42, the information from one of the buses VDRDB and VPRDB, as selected by selector 81 under control of the PRD3 signal, is loaded into the register 82. This information is thus present in the register 82 when the associated instruction is in the WRITE2 pipeline stage 42.

The flattener section 18 further includes three 22-bit buffer registers 86–88, which are controlled by the signal PIPERDY and are coupled in series between the flattener section inputs for the PAB bus and one set of inputs to a two-to-one selector 89. The other set of inputs to the selector 89 are coupled to the flattener section inputs for the DWAB bus. The selector 89 has a control input which is coupled to the signal MAC3. The outputs of selector 89 are coupled to inputs of a further 22-bit buffer register 90, the outputs of which serve as the flattener output bus F5.

As mentioned above, the information on the PAB bus is valid for a given instruction when that instruction is in the READ1 pipeline stage 34. When that instruction shifts from the READ1 stage 34 to the READ2 stage 36, the information on the PAB bus is loaded into the register 86, and thereafter is advanced to the registers 87 and 88 when the instruction is advanced respectively to the EXECUTE pipeline stage 38 and the WRITE1 pipeline stage 40. While that instruction is in the WRITE1 stage 40, information for that instruction is valid on the bus DWAB, which is coupled to inputs of selector 89.

The signal MAC3, which is applied to the control input of selector 89, is actuated when an instruction currently in the WRITE1 stage is of a type that effects reads from both the program memory and data memory. When the control signal MAC3 is actuated, the selector 89 gates to its outputs the delayed information from the PAB bus which is in register 89. Otherwise, when the signal MAC is not actuated, the selector 89 gates to its outputs the information from the DWAB bus. When the associated instruction in the WRITE1 stage is advanced to the WRITE2 stage, the register 90 is loaded with the information selected by selector 89. Consequently, while that instruction is in the WRITE2 pipeline stage 42, the register 90 contains either the information for that instruction which was present on the PAB bus when the instruction was in the READ1 pipeline stage 34, or the information for that instruction which was present on the DWAB bus when the instruction was in the WRITE1 pipeline stage 40.

The flattener section 18 includes a 32-bit buffer register 96 having its inputs coupled to the flattener inputs for the VPRDB bus, and having its outputs coupled to one set of inputs to a 32-bit two-to-one selector 97. The other set of inputs to selector 97 are coupled to the flattener inputs for the DWDB bus, and the outputs of the selector 97 are coupled to inputs of a further 32-bit buffer register 98. The outputs of buffer register 98 serve as the flattener output bus F6. The registers 96 and 98 are both controlled by the signal PIPERDY, and the control input of the selector 97 is coupled to the signal MAC3.

When an instruction is in the pipeline EXECUTE stage 38, valid information for that instruction is present on the bus VPRDB. When the instruction is thereafter advanced to the WRITE1 pipeline stage 40, the register 96 is loaded with the information from the bus VPRDB. When the MAC3 signal is actuated, the selector 97 gates to its outputs the information from the register 96. Otherwise, when the MAC signal is not actuated, the selector 97 gates to its outputs the information from the DWDB bus. When the instruction in the WRITE1 stage 40 advances to the WRITE2 stage 42, the information selected by selector 97 is loaded into the register 98, and thus is present in the register 98 while the associated instruction is in the WRITE2 stage 42.

Turning now to the selector section 19, a 22-bit two-to-one selector 111 has a first set of inputs coupled to the PAB bus, has a second set of inputs coupled to the flattener output bus F1, and has outputs coupled to inputs of a 22-bit buffer register 112. The outputs of the register 112 serve as the 22-bit output bus PA from the selector section 19 and from the integrated circuit 12. Similarly, a 32-bit two-to-one selector 115 has a first set of inputs coupled to the bus PRDB, a second set of inputs coupled to the flattener output bus F2, and outputs coupled to the inputs of a 32-bit buffer register 116, the outputs of register 116 serving as the output bus PD. A 22-bit two-to-one selector 119 has a first set of inputs coupled to the bus DRAB, a second set of inputs coupled to the flattener output bus F3, and outputs coupled to inputs of a 22-bit buffer register 120, the outputs of register 120 serving as the output bus RA.

A 32-bit two-to-one selector 123 has a first set of inputs coupled to the bus DRDB, a second set of inputs coupled to the flattener output bus F4, and outputs coupled to inputs of a 32-bit register 124, the outputs of register 124 serving as the output bus RD. A 22-bit two-to-one selector 127 has a first set of inputs coupled to the bus DWAB, a second set of inputs coupled to the flattener output bus F5, and outputs coupled to inputs of a 22-bit buffer register 128, the outputs of register 128 serving as the output bus WA. A 32-bit two-to-one selector 131 has a first set of inputs coupled to the bus DWDB, a second set of inputs coupled to the flattener output bus F6, and outputs coupled to inputs of 32-bit buffer register 132, the outputs of register 132 serving as the output bus WD.

Each of the selectors ll, 115, 119, 123, 127 and 131 has a control input which is coupled to the signal VIS. The registers 112, 116, 120, 124, 128 and 132 each have a clock or control input which is coupled to the signal PIPERDY. When the signal VIS is deactuated, which represents a flattener mode of operation, the selectors 111, 115, 119, 123, 127 and 131 respectively gate to their outputs the information from the respective buses F1, F2, F3, F4, F5 and F6. Thus, in the flattener mode of operation, when an instruction is advanced out of the WRITE2 pipeline stage 42, the six registers 112, 116, 120, 124, 128 and 132 of the selector section 19 are respectively loaded with the information from the six flattener output buses F1–F6, or in other words the contents of the registers 55, 65, 75, 82, 90 and 98 of flattener section 18. Consequently, in the flattener mode of operation, the six registers 112, 116, 120, 124, 128, and 132 of the selector section 19 will contain respective elements of information which all correspond to a given instruction, which were gathered at various times from various pipeline stages during execution of the instruction, and which have been. aligned in time by the flattener section 18.

On the other hand, if the signal VIS is actuated, in order to select the visibility mode of operation, the six selectors 111, 115, 119, 123, 127 and 131 of the selector section 19 will gate to their outputs the information from the buses PAB, PRDB, DRAB, DRDB, DWAB and DWDB, respectively. These six buses carry current information for various stages of the pipeline, or in other words information associated with two or more different instructions which are currently at different stages of execution. This differs from the flattener mode of operation, where the six registers in selector section 19 all contain information associated with a single instruction.

Figure 4B:
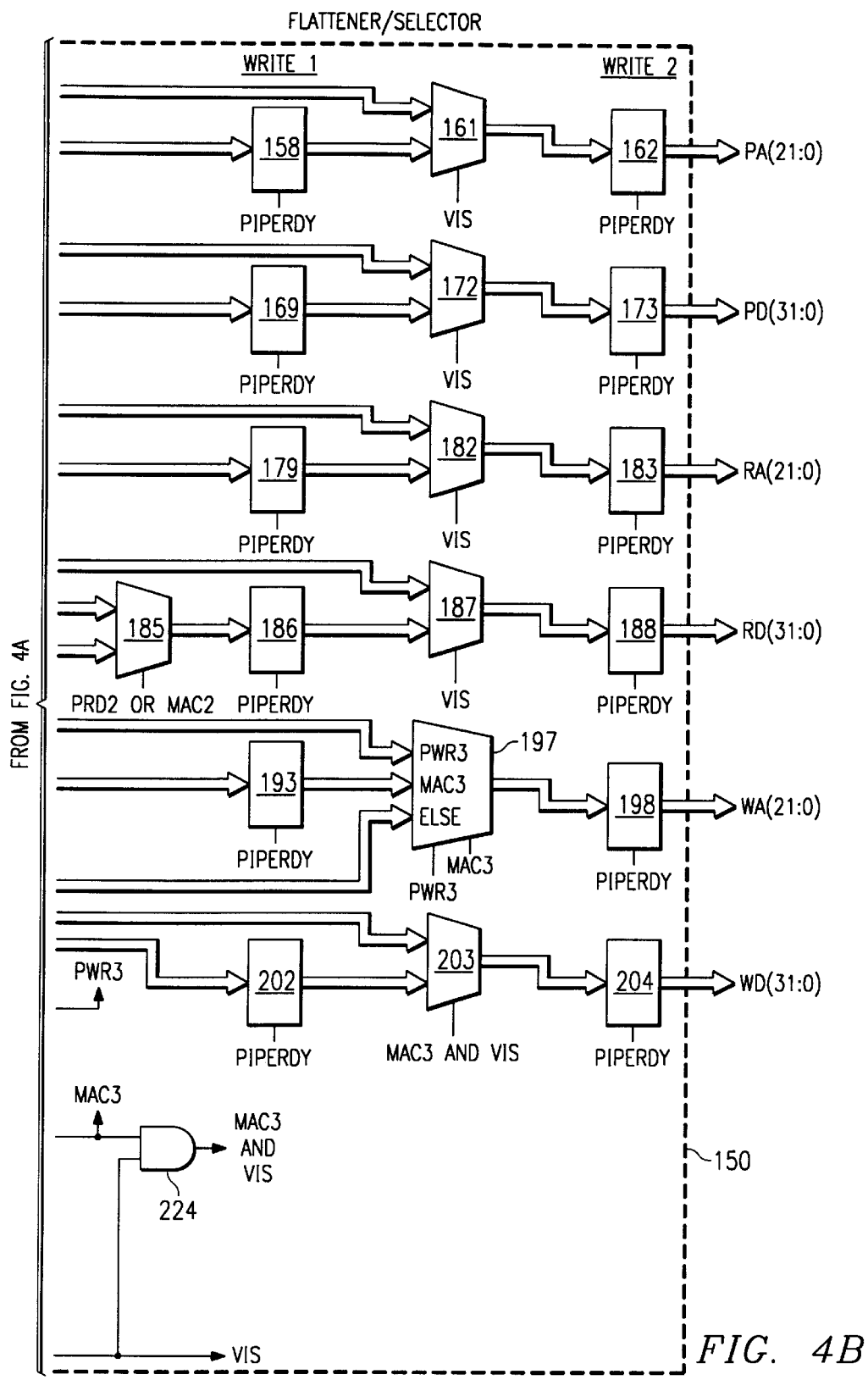
FIG. 4 is a diagrammatic view of an alternative embodiment of the subject matter of FIG. 3.

FIG. 4 depicts a flattener/selector circuit 150, which is an alternative embodiment of the circuit depicted in FIG. 3. The circuit 150 more closely integrates the functions of the flattener section 18 and selector section 19 of FIG. 3, and in a manner which reduces the total number of registers and selectors required.

More specifically, the circuit 150 includes four 22-bit buffer registers 155–158 which are coupled in series between the PC bus and a first set of inputs to a 22-bit two-to-one selector 161. The other set of inputs for the selector 161 are coupled to the PAB bus. The outputs of selector 161 are coupled to inputs of a buffer register 162, the outputs of buffer register 162 serving as the output bus PA from the circuit 150. Similarly, four 32-bit buffer registers 166–169 are coupled in series between the IREG bus and a first set of inputs to a two-to-one selector 172. The other set of inputs to the selector 172 are coupled to the PRDB bus, and the outputs of selector 172 are coupled to inputs of a 32-bit buffer register 173. The outputs of buffer register 173 serve as the output bus PD from the circuit 150.

A 22-bit two-to-one selector 176 has a first set of inputs coupled to the DRAB bus, and a second set of inputs coupled to the PAB bus. Three 22-bit buffer registers 177–179 are coupled between the outputs of selector 176 and a first set of inputs to a further 22-bit two-to-one selector 182. The other set of inputs to selector 182 are coupled to the DRAB bus, and the outputs of selector 182 are coupled to inputs of a further 22-bit buffer register 183. The outputs of buffer register 183 serve as the output bus RA from the circuit 150. A 32-bit two-to-one selector 185 has a first set of inputs coupled to the VPRDB bus and a second set of inputs coupled to the VDRDB bus. The outputs of selector 185 are coupled to inputs of a 32-bit buffer register 186, and the outputs of buffer register 186 are coupled to a first set of inputs to a further 32-bit two-to-one selector 187. The other set of inputs to the selector 187 are coupled to the DRDB bus, and the outputs of selector 187 are coupled to inputs of a 32-bit buffer register 188. The outputs of register 188 serve as the output bus RD from circuit 150.

Three 22-bit buffer registers 191–193 are coupled in series between the DRAB bus and a first set of inputs to a 22-bit three-to-one selector 197. A second set of inputs to the selector 197 are coupled to the PAB bus, and a third set of inputs to the selector 197 are coupled to the DWAB bus. The outputs of the selector 197 are coupled to inputs of a 22-bit buffer register 198, the outputs of register 198 serving as the output bus WA from circuit 150.

A 32-bit buffer register 202 has its inputs coupled to the VPRDB bus, and its outputs coupled to a first set of inputs to a 32-bit two-to-one selector 203. The other set of inputs to the selector 203 are coupled to the DWDB bus, and the outputs of the selector 203 are coupled to inputs of a 32-bit buffer register 204. The outputs of the buffer register 204 serve as the output bus WD from the circuit 150.

Three 1-bit buffer registers 207–209 are coupled in series, the input to register 207 being a signal PWRITE from the instruction pipeline, and the output of register 209 being a control signal PWR3. The control signal PWR3 is a delayed state of the control signal PWRITE. Three more buffer registers 212–214 are also coupled in series, the input to register 212 being the control signal MAC from the instruction pipeline, the output of register 213 being a control signal MAC2, and the output of register 214 being a control signal MAC3. The control signals MAC2 and MAC3 are respective different delayed states of the control signal MAC. Two further 1-bit buffer registers 218 and 219 are coupled in series, the input to register 218 being the control signal PREAD from the instruction pipeline, and the output of register 219 being a control signal PRD2. The control signal PRD2 is a delayed version of the control signal PREAD.

A two-input OR gate 221 has its inputs respectively coupled to the control signals PREAD and MAC. The output of the OR gate 221 is a control signal PREAD_OR_MAC. A two-input OR gate 222 has its inputs respectively coupled to the control signals MAC2 and PRD2. The output of the OR gate 222 is a control signal PRD2_OR_MAC2. A two-input AND gate 224 has its inputs respectively coupled to the control signal MAC3 and the mode control signal VIS. The output of the AND gate 224 is a control signal MAC3_AND_VIS.

Each of the buffer registers shown in FIG. 4 has a control input which is coupled to the signal PIPERDY. Thus, all of these buffer registers are substantially simultaneously loaded by the signal PIPRDY, at the same time that the signal PIPRDY causes each of the various instructions in the pipeline to simultaneously shift from a respective stage of the pipeline to the next successive stage.

The selector 176 has a control input, which is coupled to the control signal PREAD_OR_MAC from the output of gate 221. Thus, if either the signal PREAD or the signal MAC is actuated, the selector 176 will gate to its outputs the information from the DRAB bus, whereas if neither of these signals is actuated, the selector 176 will gate to its outputs the information from the PAB bus.

The selector 185 has a control input which is coupled to the control signal PRD2_OR_MAC2 from the output of gate 222. Thus, if either the signal PRD2 or the signal MAC2 is actuated, the selector 185 will gate to its outputs the information from the VDRDB bus, whereas if neither of these signals is actuated, the selector 185 will gate to its outputs the information from the VPRDB bus.

The selector 197 has two control inputs, one of which is coupled to the control signal PWR3, and the other of which is coupled to the control signal MAC3. The signals PWR3 and MAC3 are mutually exclusive, in that they are never both actuated at the same time. When the PWR3 control signal is actuated, the selector 197 gates to its outputs the information from the PAB bus. When the control signal MAC3 is actuated, the selector 197 gates to its outputs the information from the register 193. When neither of the signals PWR3 and MAC3 is actuated, the selector 197 gates to its outputs the information from the DWAB bus.

Although the selector 197 is functionally a three-to-one selector, and is accurately depicted as such in FIG. 4, it may be convenient to implement it using a four-to-one selector. In the case of a four-to-one selector, the two control inputs would be respectively coupled to the PWR3 and MAC3 control signals. One of the four sets of data inputs would be unused, namely the set corresponding to the state where the signals PWR3 and MAC3 are both actuated. This is because, as mentioned above, PWR3 and MAC3 are mutually exclusive and never simultaneously actuated.

The selector 203 has a control input which is coupled to the signal MAC3_AND_VIS from the output of gate 224.

Thus, when the signal MAC3 and the signal VIS are both actuated, the selector 203 gates to its outputs the information from the DWDB bus. Otherwise, the selector 203 gates to its outputs the information from the register 202.

The selectors 161, 172, 182 and 187 each have a control input which is coupled to the signal VIS. When the signal VIS is actuated, the selectors 161, 172, 182 and 187 respectively gate to their outputs the information from the buses PAB, PRDB, DRAB, and DRDB, respectively. On the other hand, when the signal VIS is not actuated, the selectors 161, 172, 182 and 187 respectively gate to their outputs the information from the registers 158, 169, 179 and 186, respectively.

It will be recognized that the registers 155, 166, 207, 212 and 218 each hold information corresponding to the instruction which is currently in the READ1 stage of the pipeline. Similarly, the registers 156, 167, 177, 191, 208, 213 and 219 each hold information corresponding to the instruction which is currently in the READ2 stage of the pipeline. Registers 157, 168, 178, 192, 209 and 214 each hold information corresponding to the instruction which is currently in the EXECUTE stage of the pipeline. Registers 158, 169, 179, 186, 193 and 202 each hold information corresponding to the instruction which is currently in the WRITE1 stage of the pipeline. Registers 162, 173, 183, 188, 198 and 204 each hold information corresponding to the instruction which is currently in the WRITE2 stage of the pipeline.

The operation of the circuit 150 of FIG. 4, which includes a flattener mode of operation and a visibility mode of operation, is generally similar to the operation of the circuitry shown in FIG. 3. To avoid redundancy, the operation of the circuit 150 of FIG. 4 is therefore not described in detail.

The present invention provides numerous technical advantages. One such technical advantage is that the provision of a flattener circuit within an integrated circuit provides the flattener with direct access to pipeline signals that are not needed outside the chip for any other reason, thereby avoiding the need to allocate external connection pins to these signals, and thus reducing the number of external connection pins of the integrated circuit which are dedicated to implementation of the flattener. Further, this avoids the need to provide circuitry which is external to the integrated circuit, which generates certain control signals that are also generated within the integrated circuit, and which is thus duplicative of circuitry within the integrated circuit. A further advantage is that, by moving the flattener close to the source of pipeline activity, the flattener is capable of operation at the speed of the processor, even when the processor is operating at higher frequencies, and without excessive cost. Yet another advantage is that it is possible to select whether information obtained from the pipeline is time-aligned information for a particular instruction, or current information for various different instructions.

Although two embodiments have been illustrated and described in detail, it should be understood that various changes, substitutions and alterations can be made therein without departing from the scope of the present invention. For example, an exemplary arrangement of selectors and buffer registers has been shown in FIG. 3, and another exemplary arrangement has been shown in FIG. 4. Nevertheless, it will be recognized that there are numerous other arrangements of selectors and buffer registers which fall within the scope of the present invention, as well as arrangements which include other types of devices but are still encompassed by the present invention. Further, although the embodiments of FIGS. 3 and 4 use primarily two-to-one selectors, it will be recognized that other types of selectors could be used. In addition, the disclosed embodiments have pipelines with specified stages, but it will be recognized that the pipeline could have a different arrangement or sequence of stages, without departing from the present invention.

It will also be recognized that direct connections disclosed herein could be altered, such that two disclosed components or elements are coupled to one another through an intermediate device or devices without being directly connected, while still realizing the present invention. Other changes, substitutions and alterations are also possible without departing from the spirit and scope of the present invention, as defined by the following claims.

What is claimed is:

1. An integrated circuit, comprising:

a plurality of external connection pins;

a processor which executes instructions from an instruction sequence, said processor including an instruction execution pipeline having a plurality of successive stages which correspond to respective successive phases of instruction execution, said pipeline being operative to move instructions of the instruction sequence successively through said stages so that, at each of a plurality of successive points in time, each said stage corresponds to a respective phase of execution of a respective instruction, said stages of said pipeline including a first stage, and including a second stage immediately successive to said first stage; and a flattener register having an output which is coupled to a selected one of said external connection pins, and having an input which is coupled to a signal of said pipeline associated with said first stage, said integrated circuit being operative to cause said register to be loaded from said input based on an instruction being moved from said first stage to said second stage, wherein when that instruction is in said second stage said register maintains the state which the signal had when that instruction was in said first stage wherein a selector having a control input, having first and second inputs, and having an output, said first input of said selector being coupled to said output of said register, said second input of said selector being coupled to a signal of said pipeline, and said output of said selector being coupled to said selected one of said external connection pins, said control input of said selector being coupled to one of said external connection pins other than said selected one of said external connection pins.

2. An integrated circuit, comprising:

a plurality of external connection pins;

a processor which executes instructions from an instruction sequence, said processor including an instruction execution pipeline having a plurality of successive stages which correspond to respective successive phases of instruction execution, said pipeline being operative to move instructions of the instruction sequence successively through said stages so that, at each of a plurality of successive points in time, each said stage corresponds to a respective phase of execution of a respective instruction, said stages of said pipeline including a first stage, and including a second stage immediately successive to said first stage; and a flattener register having an output which is coupled to a selected one of said external connection pins, and having an input which is coupled to a signal of said pipeline associated with said first stage, said integrated circuit being operative to cause said register to be loaded from said input based on an instruction being moved from said first stage to said second stage, wherein when that instruction is in said second stage said register maintains the state which the signal had when that instruction was in said first stage wherein first and second selectors which each have a control input, first and second inputs, and an output, said first input of said first selector being coupled to said output of said register, said first input of said second selector being coupled to a signal of said pipeline, said second inputs of said selectors being coupled to respective signals of said pipeline, said output of said first selector being coupled to said selected one of said external connection pins, said output of said second selector being coupled to a further said external connection pin different from said selected one of said external connection pins, and said control inputs of said selectors being coupled to one of said external connection pins other than said further external connection pin and said selected one of said external connection pins.

3. An integrated circuit, comprising:

a plurality of external connection pins;

a processor which executes instructions from an instruction sequence, said processor including an instruction execution pipeline having a plurality of successive stages which correspond to respective successive phases of instruction execution, said pipeline being operative to move instructions of the instruction sequence successively through said stages so that, at each of a plurality of successive points in time, each said stage corresponds to a respective phase of execution of a respective instruction, said stages of said pipeline including a first stage, and including a second stage immediately successive to said first stage; and a flattener register having an output which is coupled to a selected one of said external connection pins, and having an input which is coupled to a signal of said pipeline associated with said first stage, said integrated circuit being operative to cause said register to be loaded from said input based on an instruction being moved from said first stage to said second stage, wherein when that instruction is in said second stage said register maintains the state which the signal had when that instruction was in said first stage wherein:

an additional register having an input which is coupled to said output of said flattener register and having an output which is coupled to said selected one of said external connection pins; and a second additional register having an output which is coupled to one of said external connection pins other than said selected one of said external connection pins, and having an input which is coupled to a signal of said pipeline associated with said second stage;

said integrated circuit being operative to cause said additional and second additional registers to be loaded substantially simultaneously with said flattener register.

4. An integrated circuit, comprising:

a plurality of external connection pins;

a processor which executes instructions from an instruction sequence, said processor including an instruction execution pipeline having a plurality of successive stages which correspond to respective successive phases of instruction execution, said pipeline being operative to move instructions of the instruction sequence successively through said stages so that, at each of a plurality of successive points in time, each said stage corresponds to a respective phase of execution of a respective instruction, said stages of said pipeline including a first stage, and a second stage immediately successive to said first stage;

first and second selectors which each have first and second inputs and an output, said first input of said first selector and said first and second inputs of said second selector being coupled to respective signals of said pipeline;

a first register having an input which is coupled to a signal of said pipeline associated with said first stage, and having an output which is coupled to said second input of said first selector, said integrated circuit being operative to cause said first register to be loaded from said input thereof in association with an instruction being moved from said first stage to said second stage, wherein when that instruction is in said second stage said first register maintains the state which the signal had when that instruction was in said first stage; and second and third registers which each have an input coupled to an output of a respective said selector and which each have an output coupled to a respective one of said external connection pins of said integrated circuit, said integrated circuit being operative to cause said second and third registers to each be loaded from said input thereof approximately when said first register is loaded.

5. An integrated circuit according to claim 4, wherein said first and second selectors each have a control input which is coupled to one of said external connection pins other than an additional external connection pin and said selected one of said external connection pins.

6. An integrated circuit according to claim 4, wherein said first input of said first selector and said first input of said second selector are coupled to signals associated with different stages of said pipeline.

7. An integrated circuit according to claim 4, including a third selector having a control input, having first and second inputs which are coupled to respective signals of said pipeline, and having an output which is coupled to said input of said register, said control input of said third selector being controlled as a function of a signal from said pipeline.

8. An integrated circuit according to claim 4, including:

a third selector having a control input, having first and second inputs which are coupled to respective signals of said pipeline, and having an output which is coupled to said input of said flattener register; and an additional register having an input coupled to a signal of said pipeline and having an output, said control input of said third selector being controlled as a function of said output of said further register.

* * * * *